INVENTOR.
GEORGE HAUMANN
BY Williams, David,
Hoffmann & Fount
ATTORNEYS

INVENTOR.
GEORGE HAUMANN
BY Williams, David,
Hoffmann & Yount
ATTORNEYS

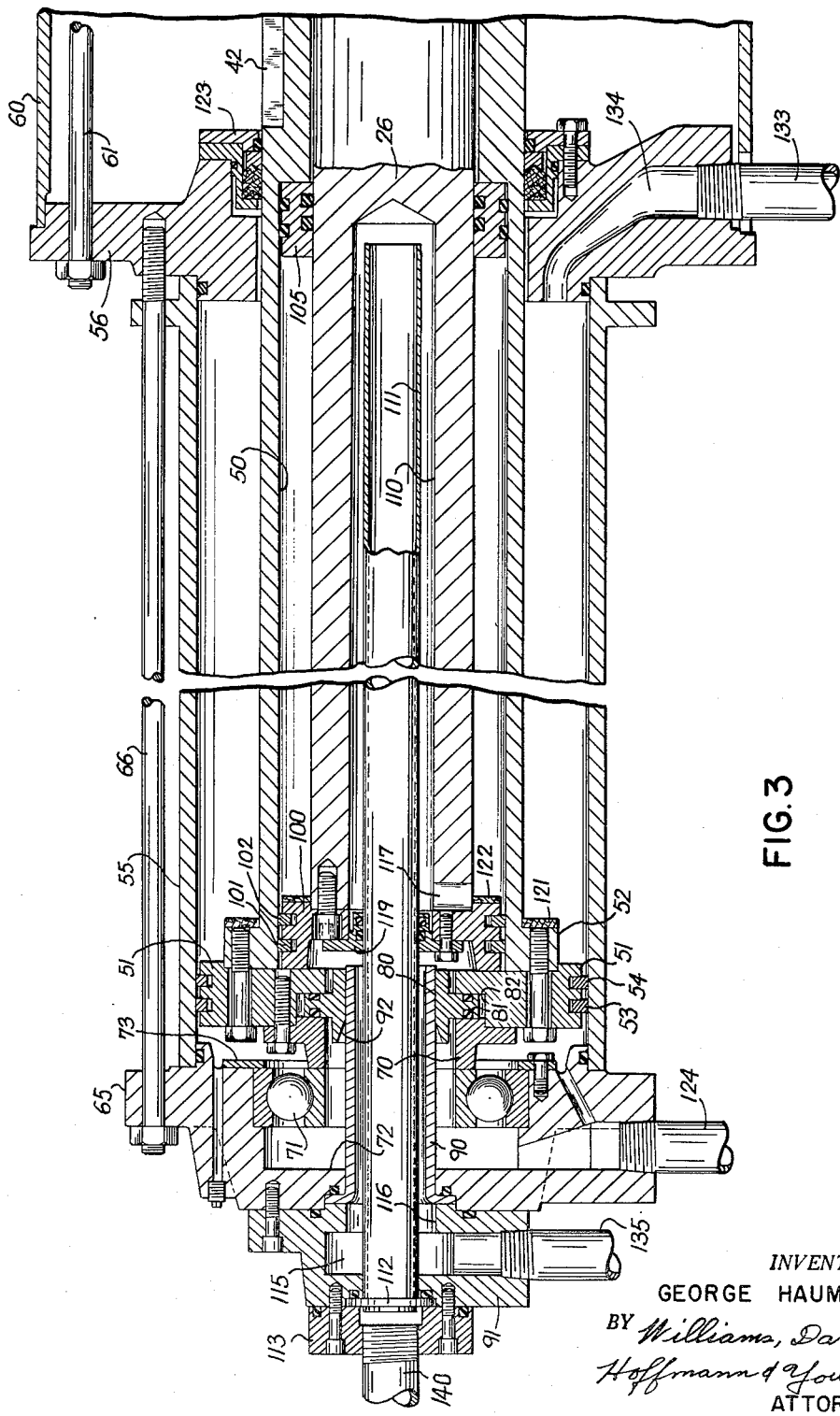

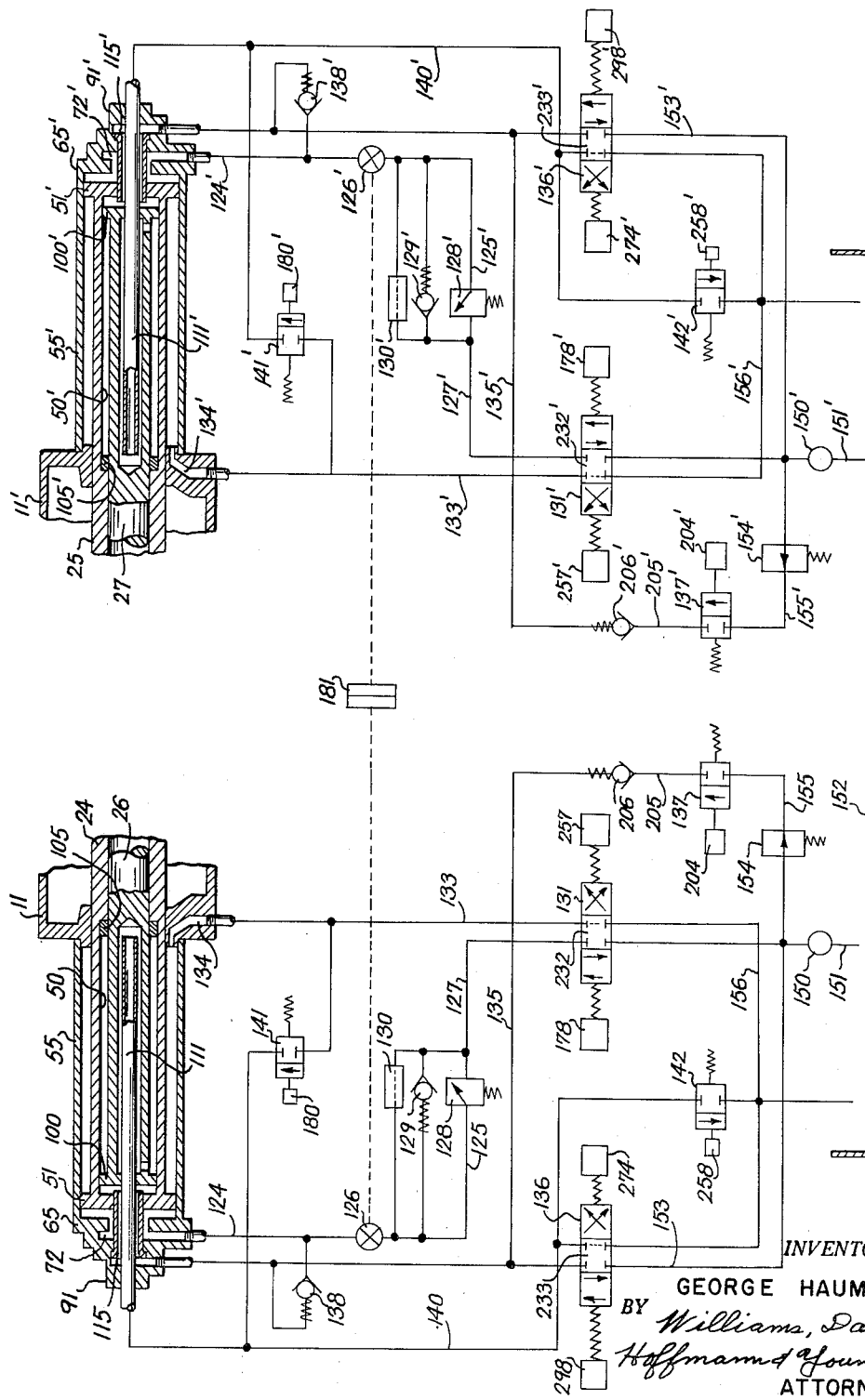

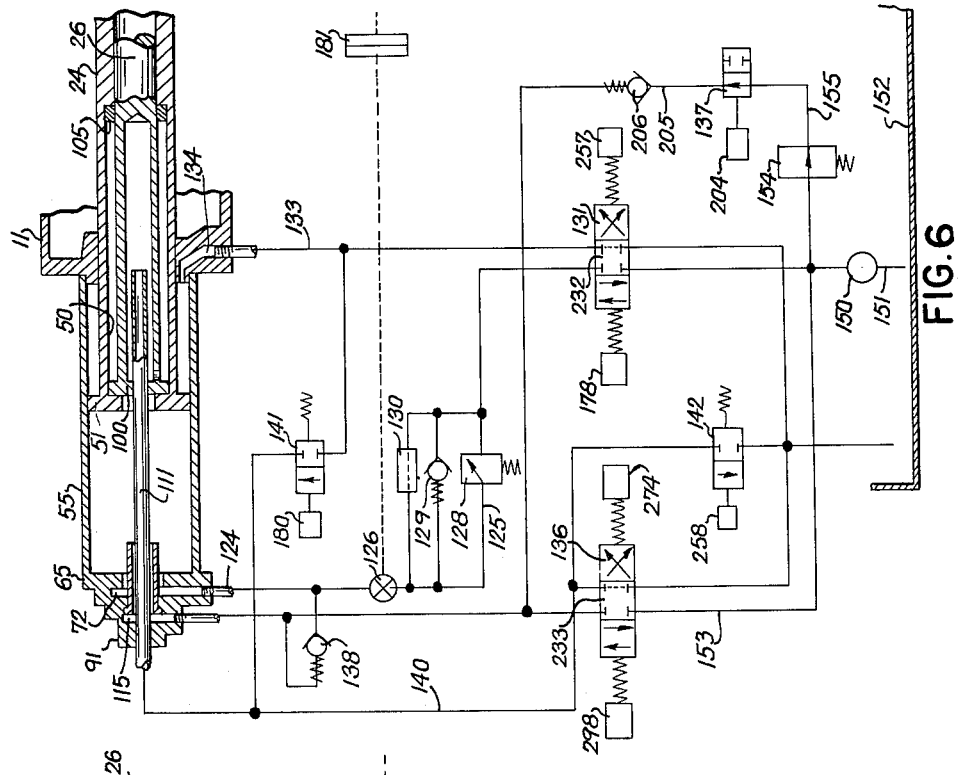
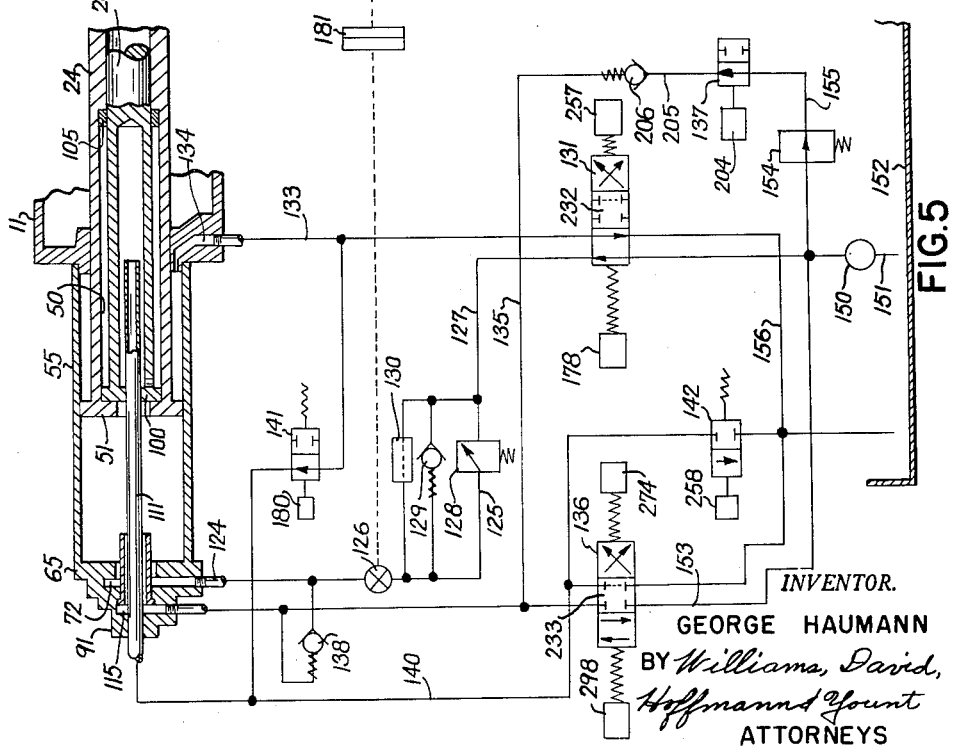

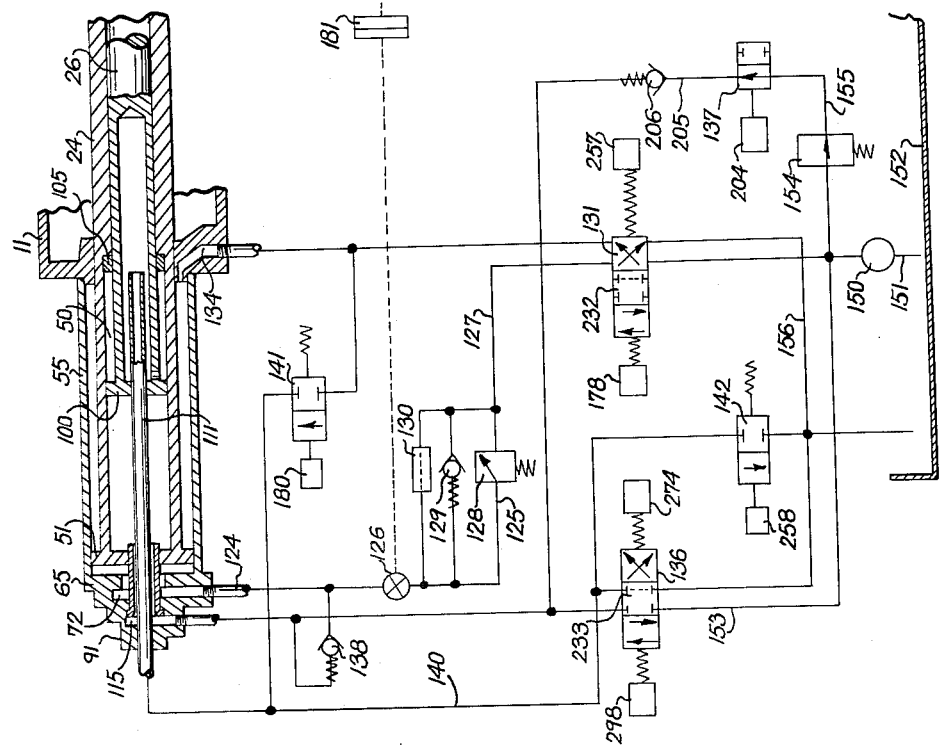

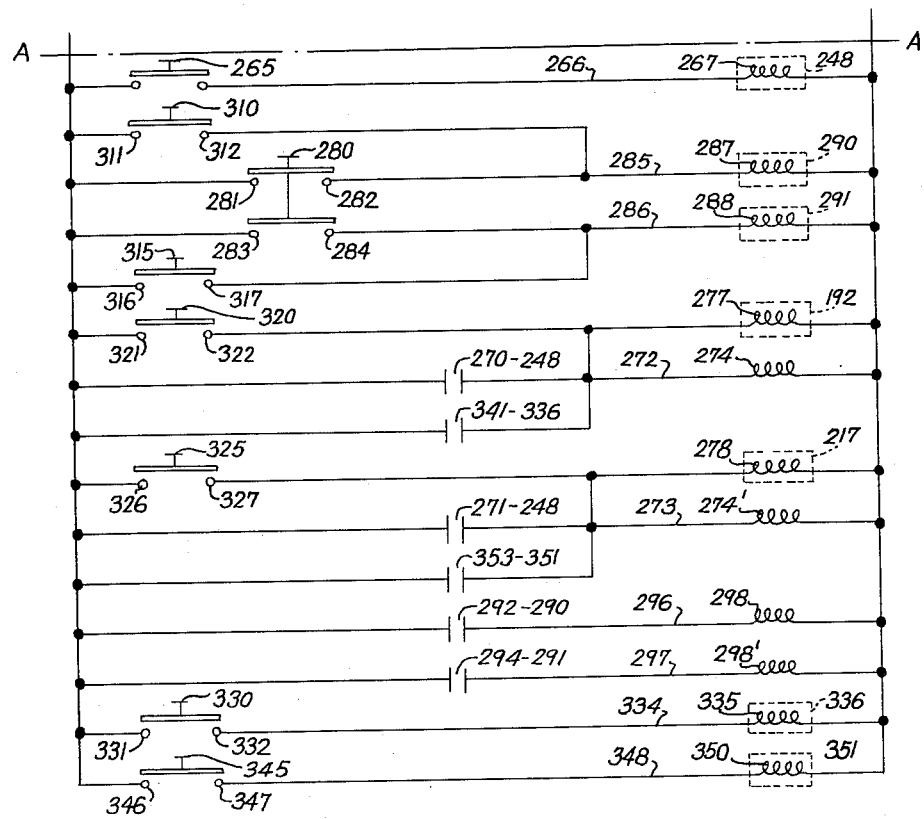
FIG.9$^b$

United States Patent Office 3,139,004
Patented June 30, 1964

3,139,004
PRESSURE FLUID ACTUATED POWER MEANS FOR A VENEER LATHE
George Haumann, Portland, Oreg., assignor to The Coe Manufacturing Company, Painesville, Ohio, a corporation of Ohio
Filed Aug. 28, 1961, Ser. No. 134,254
2 Claims. (Cl. 91—167)

The present invention relates to veneer lathes and more particularly to a veneer lathe comprising a hydraulically reciprocated coaxial pair of concentric spindles provided with chucks for holding one end of a log to be peeled.

One of the principal objects of the invention is the provision of a novel veneer lathe having two coaxial concentric spindles provided with chucks of different diameter for holding one end of a log to be peeled in combination with double acting reciprocating type fluid actuated power motor means controllable from a convenient location about the machine for reciprocating the spindles to selectively engage and disengage the chucks carried thereby wtih a log to be peeled and to maintain a selected chuck or chucks in tight engagement with the log during the cutting operation.

Another object of the invention is the provision of a novel veneer lathe having two concentric pairs of chucks adapted to hold a log to be peeled which chucks are carried on adjoining ends of aligned concentric pairs of axially spaced spindles rotatably supported in the lathe frame in combination with electrically controlled double acting reciprocating type fluid actuated motor means for reciprocating the spindles to selectively move the respective pairs of chucks into and out of engagement with logs to be cut and to securely hold the logs during the cutting operation.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which—

FIG. 3 is an enlarged view of the left-hand end of FIG. 2 showing the fluid pressure actuated motor means for the left-hand spindles in considerable detail;

FIG. 4 is a diagrammatic view of the hydraulic system of the lathe with the spindles in the retracted position;

FIG. 5 is a view similar to the left-hand half of FIG. 4 but with the spindles moving towards "dog" position;

FIG. 6 is a view similar to the left-hand half of FIG. 4 but with the spindles partly extended and holding a log therebetween;

FIG. 7 is a view similar to the left-hand half of FIG. 4 but with the outer and larger spindles moving towards their retracted positions while the log is being held by the inner and smaller spindles;

FIG. 8 is a view similar to FIG. 6 but subsequent to the complete retraction of the larger and outer spindles; and FIGS. 9a and 9b are a wiring diagram showing the electrical control circuits for the lathe.

Figure 1:
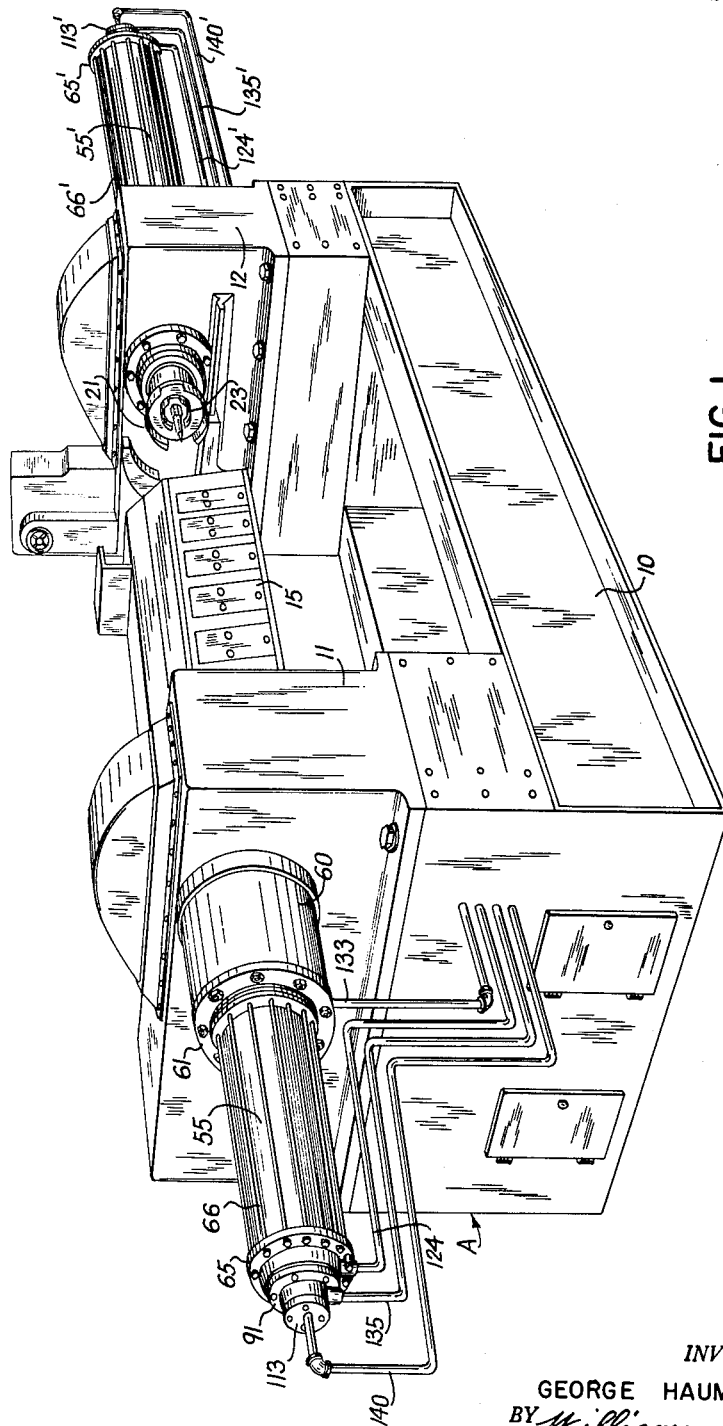
FIG. 1 is a perspective back view of a veneer lathe embodying the present invention.

While the invention is susceptible of various modifications and alternate constructions, the preferred embodiment is shown in the drawings and herein described in detail. It is to be understood, however, that there is no intention to thereby limit the invention to the specific forms disclosed, but it is the intention to cover all modifications and alternative constructions falling within the spirit and scope of the invention as expressed in the appended claims.

The invention is herein illustrated and described as embodied in a more or less conventional veneer lathe and only those parts of the machine which are necessary to a complete understanding of the invention are shown and described in detail. The parts of the lathe not shown and described per se form no part of the present invention and are well known in the art.

Referring to the drawings, the veneer lathe shown comprises a frame of built-up construction designated generally by the reference character A and includes a rectangular base 10 having upstanding end members 11 and 12 fixedly secured to the base at opposite ends thereof. The upper parts of the end members 11, 12 are separately formed and bolted to the lower parts to facilitate manufacture and assembly of the lathe. A conventional knife, knife bar, and pressure bar assembly, designated generally as 15, is located intermediate the end members 11, 12 and movably supported thereby and reciprocated towards and from the axis of rotation of the lathe spindles in the usual manner.

The log to be cut is adapted to be supported between two pairs of chucks 20, 21 and 22, 23 detachably fixed to adjacent ends of axially aligned concentric pairs of spindles 24, 25 and 26, 27, respectively. The outer and larger spindles 24, 25 are tubular and the inner and smaller spindles 26, 27 project therethrough. The chucks 20, 21 which are carried by the larger tubular spindles 24, 25 are larger than the chucks 22, 23 carried by the inner spindles 26, 27 and are so constructed that the smaller chucks 22, 23 may be retracted or drawn flush with the larger chucks 20, 21 but cannot be retracted into the larger spindles. The spindles are adapted to be selectably moved lengthwise to engage and disengage the chucks carried thereby with opposite ends of the log to be peeled and the construction is such that either the pair of small chucks or both pairs of chucks may be employed selectively to hold the log.

Figure 2:
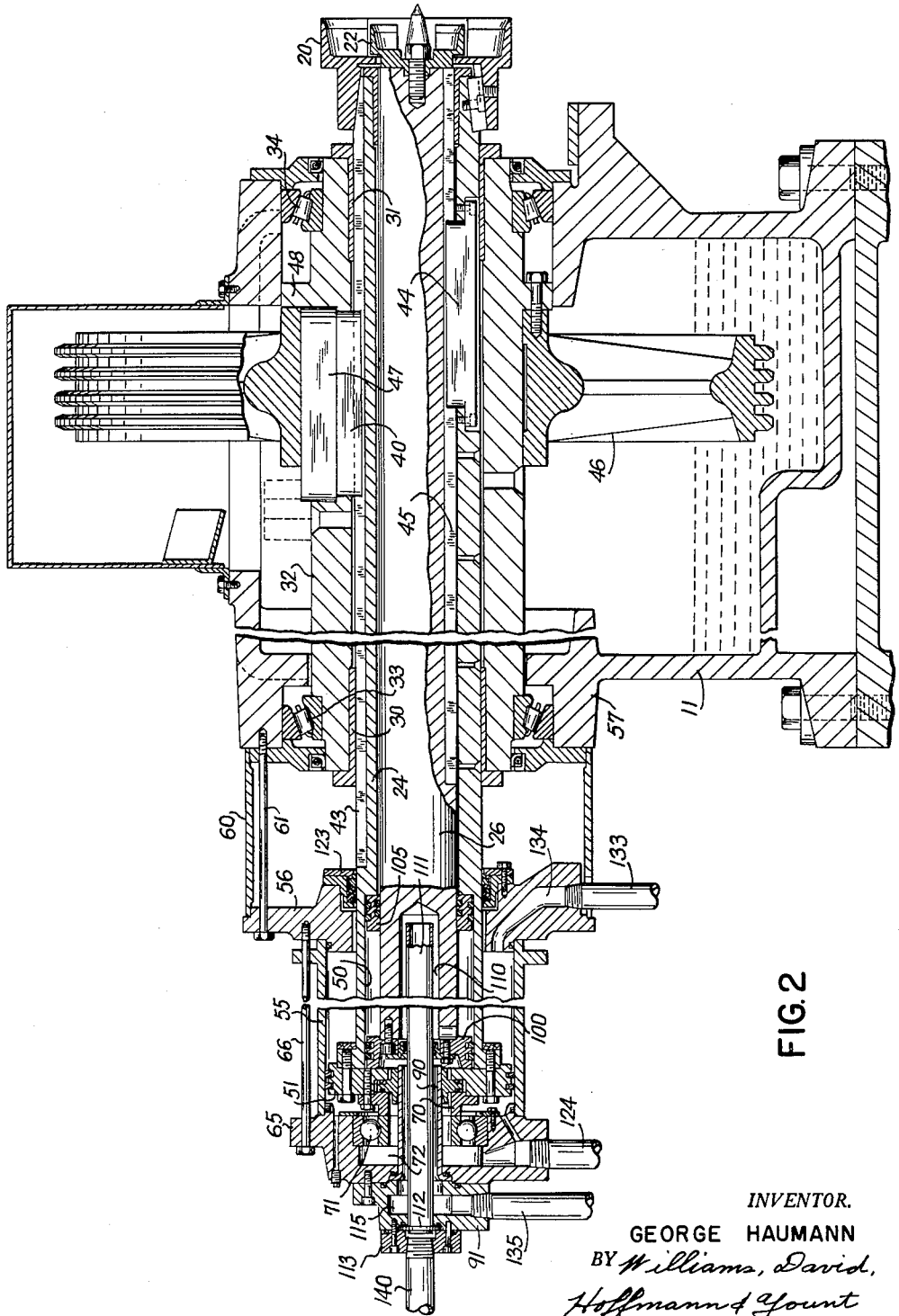
FIG. 2 is a fragmentary sectional view, with portions in elevation, taken approximately on the vertical central plane through the left-hand spindles as the lathe is viewed in FIG. 1.
Figure 9A:
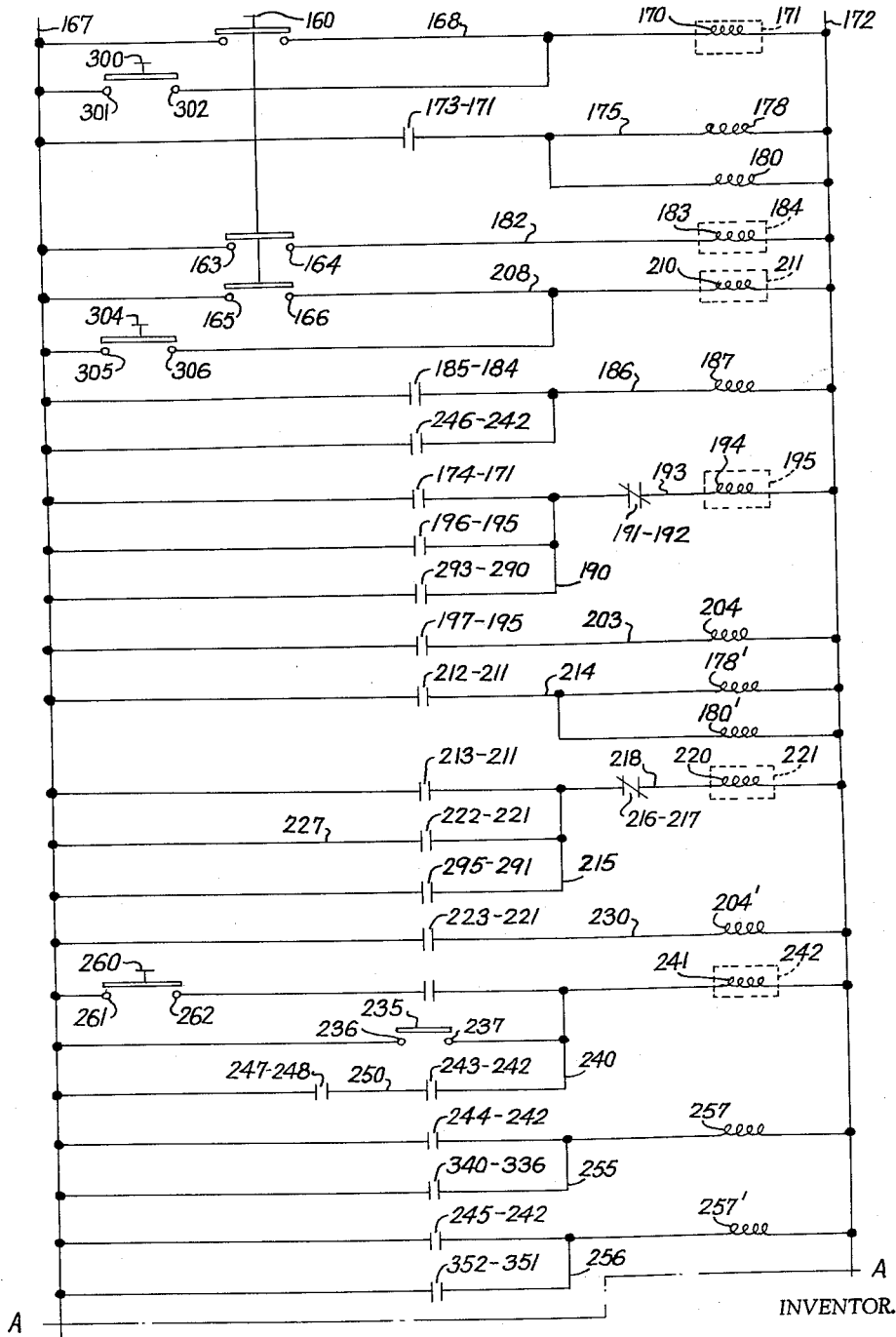

The spindles 25, 27 at the right-hand end of the lathe, as viewed in FIG. 1, are similar in construction to the spindles 24, 26 at the left-hand end of the lathe and are supported, reciprocated and driven in a similar manner. Because of this only the left-hand end of the lathe, which is the end shown in FIG. 2, will be described in detail. The parts at the right-hand or opposite end of the lathe, with the exception of a few which are otherwise designated, are designated by the same reference characters with a prime mark affixed thereto as the corresponding parts at the left-hand end of the lathe.

The outer spindle 24 at the left-hand end of the lathe is slidably supported intermediate its ends in bearing members 30, 31 fixedly secured to opposite ends of a spindle sleeve or quill 32 and having sleeve portions projecting into counterbores in the ends of the spindle quill. Opposite ends of the spindle quill 32 are rotatably supported in the end member 11 of the frame A by anti-friction bearings 33, 34. The spindle 24 is keyed to the spindle sleeve or quill 32 by an elongated key 40 located in a slot or aperture in the spindle quill 32 and projecting into an elongated keyway 43 in the spindle 24. The spindle 26 is slidably keyed to the spindle 24 by an elongated key 44 fixed in an aperture or slot in the spindle 24 and projecting into an elongated keyway 45 in the spindle 26. The drive wheel 46 is fixedly secured to the spindle sleeve or quill 32 by a key 47 and by being bolted to a radial flange 48 on the spindle sleeve.

According to the provisions of the present invention the extension of the spindles 24, 26 from the end frame member 11 is controlled by fluid pressure actuated means connected to or forming a part of the rear or left-hand ends of the spindles. The left-hand end of the spindle 24 is counterbored as at 50 and is provided with an annular-shaped piston head member 51 bolted to a radial flange 52 formed on the left-hand end of the spindle. The member 51 is provided with a pair of cast-iron split piston rings 53, 54 located in suitable annular grooves in the circumference of the member 51 and in slidable engagement with the interior wall of a cylinder member 55, the rght-hand end of which abuts against an annular member 56 fixedly secured in spaced relation to the end of a boss 57 of the frame member 11 by a thin wall cylinder-like spacer member 60, and a plurality of elongated bolts 61 extending through the member 56 and threaded into suitable tapped apertures in the boss 57 of the frame of the lathe.

The left-hand end of the cylinder-like member 55 is closed by a cup-shaped member or cylinder head 65 held in abutment against the left-hand end of the member 55 by a plurality of elongated bolts 66 extending through the member 65 and threaded into suitable tapped apertures in the member 56. The bolts 66 are located externally of the cylinder member 55. The members 56 and 65 have bosses projecting into opposite ends of the cylinder member 55, which bosses are provided with O-ring seals for preventing the escape of fluid between the members 56, 65 and the ends of the cylinder member 55 engaged thereby. An annular member 70 bolted to the left-hand side of the piston head member 51 has a boss projecting towards the left which is adapted to engage the inner race of a ball bearing 71 carried by the member 65 when the spindle 24 is in its extreme left-hand or retracted position. The ball bearing 71 is secured in the head member 65 by having its outer race located in a counterbore 72 therein facing towards the adjacent end of the spindle 24. The outer race of the bearing 71 is retained in the counterbore mentioned by an annular ring 73 bolted to the right-hand face of the member 65.

In addition to the parts already mentioned the left-hand end of the spindle 24 carries a tubular member 80 having a radial flange 81 located intermediate its ends and projecting into a groove 82 formed by a counterbore in the left-hand side of the member 51 and the right-hand end of the member 70 which projects into the counterbore. The groove 82 is of slightly greater inside diameter than the outside diameter of the flange 81 with the result that the member 80 can shift therein radially of the axis of rotation of the spindle 24. When the spindle 24 is in its fully retracted position, that is, the position shown in FIGS. 2 and 3, the member 80 surrounds the right-hand end of a tube 90, the left-hand end of which is flanged and clamped in a counterbore in the left-hand side of the member 65 by an annular member 91 secured by cap screws to the left-hand side of the member 65. The member 80 has a sliding fit upon the exterior of the tube 90 which is such that it normally prevents the flow of fluid pressure between the member 80 and the tubular member 90. The member 80 also has O-ring seals in opposite sides of its projected flange 81 which prevent the flow of fluid pressure to opposite sides thereof through the groove 82 formed by the members 51, 70 and in which it projects. Similar seals prevent the flow of pressure fluid around the flange on the member 90 and between the members 65 and 91. The left-hand end of the member 80 is provided with an internal bevel 92 to facilitate its reengagement with the member 90 upon retraction of the spindle 24.

The left-hand end of the spindle 26 is provided with an annular-shaped member or piston head member 100 affixed thereto by machine screws and provided with a pair of split-ring type piston rings 101, 102, preferably made of suitable cast metal, such as cast iron, positioned in suitable grooves in the circumference of the member 100 and in slidable engagement with the inner wall of the counterbore 50 in the spindle 24. An additional piston head member in the form of an annular ring 105 is located in the counterbore 50 of the spindle 24 to the right of the piston head member 100. This ring or piston head member floats in the counterbore and the escape of fluid pressure thereby is prevented by suitable pairs of suitable seals located in grooves in both its exterior and interior. The exterior O-rings prevent the flow of fluid pressure therebetween and the inner wall of the counterbore 50 of the spindle 24 and the interior seals prevent the flow of fluid pressure between the member 105 and and the exterior of the spindle 26.

The left-hand end of the inner and smaller spindle 26 is counterbored as indicated at 110 for the reception of a thin-walled tubular member 111 fixed in the member 91 and projecting therethrough and through the member 90 and into the interior or counterbore 110 of the spindle 26. The left-hand end of the member 111 is provided with a flange 112 positioned in a counterbore in the left-hand side of the member 91 and secured therein by a cap member 113 fixed to the left-hand side of the member 91 by cap screws. Leakage of fluid around the flange 112 is prevented by a suitable O-ring seal located at and in engagement with the right-hand side of the flange 112 and the escape of pressure fluid between the member 91 and the cap 113 is prevented by similar seal in an annular groove in the face of the cap 113 abutting the member 91.

The outside diameter of the member 111 is less than the inside diameter of the member 90 thus providing a conduit or passageway between an aperture 115 and a bore 116 communicating therewith in the member 91 and the counterbore 50 to the left-hand side of the piston head member 100 carried by the spindle 26. Attention is called to the fact that the left-hand end of the counterbore 50 is in communication with the counterbore 72 and the interior of the cylinder member 55 to the left of the piston head 51 of the outer and larger spindle 24 when the spindle 24 is advanced or moved to the right far enough to move the member 80 out of engagement with the member 90. The inside diameter of the counterbore 110 in the spindle 26 is larger than the outside diameter of the tubular member 111 thereby providing a passageway or conduit for the passage of fluid pressure from the interior of the tube 111, the right-hand end of which is open, through a radial aperture 117 in the spindle 26 adjacent to the piston head member 100, to the interior of the counterbore 50 in the spindle 24 at the left of the piston head member 100.

Flow of pressure fluid from the counterbore 50 at the left-hand side of the piston head member 100 to the counterbore 110 is prevented by a pair of O-ring seals engaging the exterior of the tubular member 111 and located in suitable grooves formed in the interior of a member 119 bolted to the left-hand face of the piston head member 110. The length of the tubular member 111 is greater than the maximum movement of the inner and smaller spindle 26 with the result that the seals carried by the member 119 never disengage the exterior of the tubular member 111. The right-hand sides of the flange 52 of the spindle 24 and the piston head member 100 of the spindle 26 are provided with resilient material 121, 122 fixed thereto in a suitable manner for cushioning the impact of the flange 52 against the left-hand face of the member 56 and the right-hand side of the piston member 100 against the member 105 when the spindles are moved to its extreme right-hand or extended positions. The opening in the member 56 through which the spindle 24 extends is sealed by a suitable gland, designated generally as 123.

Fluid can be supplied to and exhausted from the counterbore 72 in the member 65 and in turn the left-hand end of the cylinder member 55 within which the piston head member 51 connected to the outer and larger spindle 24 reciprocates, and when the member 80 is disengaged from the member 90, the left-hand end of the counterbore 50 in the spindle 24 within which the piston head member 100 connected to the interior spindle 26 reciprocates, by a conduit 124 connected thereto and to a conduit 125 by a vane-type constant displacement fluid motor 126. The latter conduit 125 is connected to a conduit 127 through a back pressure counterbalance valve 128, a check valve 129 permitting flow of fluid from the conduit 125 to the conduit 127 only, and a small by-pass valve 130. The conduit 127 is connected to a solenoid-operated three-position, spring centered, four-way control valve 131. Fluid is supplied to and exhausted from the interior of the cylinder member 55 at the right-hand side of the piston head member 51 connected to the outer and larger spindle 24 by a conduit 133 connected to a passageway 134 in the member 56 and to the solenoid-operated, three-position, spring centered, four-way control valve 131.

Fluid is supplied to and exhausted from the aperture 115 in the member 91 and in turn the counterbore 50 in the spindle 24 to the left of the piston head member 100 fixed to the inner and smaller spindle 26, and the interior of the cylinder member 55 to the left of the piston head member 51 when the member 80 is disengaged from the member 90, by a conduit 135 connected thereto and to a solenoid-operated, three-position, spring centered, four-way control valve 136 and to a solenoid operated, two-position, control valve 137 spring biased to off position. The conduits 124, 135 are connected by a check valve 138 which permits the flow of fluid from conduit 124 to conduit 135 only. Fluid is supplied to and exhausted from the interior of the tubular member 111 and in turn the interior of the counter-bore 50 in the spindle 24 intermediate the piston head member 100 connected to the spindle 26 and the member 105 slidably supported within the counterbore 50 to the right of the piston head member 100 by a conduit 140 connected to the tubular member 115 and to the solenoid-operated control valve 136, previously mentioned, and to two solenoid-operated, two position, control valves 141, 142 spring biased to off or closed positions. The valve 141 is connected between the conduits 133, 140.

Fluid, preferably oil, for operating the pressure fluid actuated means connected to the spindles 24, 26 at the left-hand end of the lathe is supplied by electric motor driven pump 150 of commercial construction, which pump is preferably of the adjustable, constant pressure, variable volume type. While a single pump may be employed as the fluid source for actuating the fluid means connected to the spindles at opposite main ends of the lathe, the use of separate pumps for supplying the fluid for the fluid actuated means at the opposite ends of the lathe has been found to be more economical and practical. By using two identical pumps driven by a common motor the corresponding spindles at opposite ends of the lathe can be moved simultaneously at or more nearly at the same speeds.

The inlet or suction side of the pump 150 is connected by a conduit 151 to an oil reservoir or sump 152 and the discharge or pressure side of the pump is connected by a conduit 153 to the two solenoid-operated control valves 131, 136 for controlling the flow of fluid to the fluid actuated motor means connected to the left-hand spindles 24, 26. The pump 150 is also connected by the conduit 153 to the solenoid-operated control valve 137 through a pressure reducing valve 154 and a conduit 155. The valves referred to with the exception of valves 137, 141 are connected to the sump 152 by a conduit 156.

Assuming that the spindles are retracted and a log to be peeled has been placed in position therebetween, both pairs of spindles and in turn the chucks carried thereby can be moved towards the log by the operator depressing the "extend all spindles" push button switch 160 to close its normally open contacts 161–162, 163–164, 165–166. The closing of contacts 161–162 establishes a circuit from the power line 167, through wire 168 and operating solenoid 170 of relay 171 to line 172 thereby actuating the relay to close its normally open contacts 173, 174. Attention is called to the fact that the various relay contacts are designated on the wiring diagram by the contact number or reference character followed by the relay number or reference character for purposes of better identification of the relay contacts.

The closing of the normally open contacts 173 of relay 171 establishes a circuit from the line 167 through wire 175 and operating solenoids 178, 180 of valves 131, 141 to line 172. The energization of the operating solenoid 178 shifts the valve 131 to the right, as shown in FIG. 5, connecting the pressure fluid supply conduit 153 with the conduit 127 allowing fluid under pressure to flow through the conduit 127, check valve 129, conduit 125, vane-type fluid motor 126, conduit 124 and aperture 72 to the interior of the cylinder member 55 at the left of the piston head member 51 connected to the left-hand end of the outer and larger spindle 24. This causes the spindle 24 and in turn the spindle 26 to move towards the right and to be extended from the frame member 11. The inner and small spindle 26 is carried forwardly with the larger spindle 24 because of the interference or abutment of the lefthand side of the spindle head member 100 connected to the left-hand end of the spindle 26 with the right-hand face of the spindle head member 51 connected to the left-hand end of the spindle 24, and/or the chucks 20, 22. The energization of the operating solenoid 180 of valve 141 shifts the valve to the right, as shown in FIG. 5, connecting conduits 133, 140 thus permitting oil to flow from the end of the cylinder 55 to the right of piston head 51 to the interior of counterbore 110 in spindle 26 and thereby fill the void or space occurring therein by the movement of the piston head 100 along the tube 111, in other words, by the retraction of the tube 111 from the apertures 110.

In the embodiment shown the check valve 138 interposed between the conduits 124, 135 will permit fluid pressure to flow from the conduit 124 to the conduit 135 and in turn to the aperture 115 in the member 91 and the left-hand end of the counterbore or cylinder 50 in the spindle 24 and apply pressure fluid to the left of the spindle head member 100 connected with the left-hand end of the small spindle 26. With this arrangement fluid pressure is applied to both piston head members 51, 100 upon the application of fluid to the conduit 124. Attention is called to the fact, however, that the left-hand sides of both piston head members are in communication with one another at all times that the member 80, forming a part of the piston head assembly of which the piston head member 51 connected to the outer and larger spindle 24, is clear of the tubular member 90.

The rotor of the motor 126 is adapted to be selectively connected to and from the rotor of the corresponding motor 126′ associated with the control for the fluid motors which operate the right-hand spindles 25, 27 by a magnetic clutch 181 so that when both large spindles are moved simultaneously in either direction they will travel at the same speed.

In the present instance the clutch 181 is energized by the closing of contacts 163–164 of switch 160 which establishes a circuit from the line 167 through now closed contacts 163–164, wire 182 and operating solenoid 183 of relay 184 to line 172. Energization of relay 184 closes its normally open contacts 185 establishing a circuit from the line 167 through wire 186 and operating solenoid 187 of clutch 181 to line 172.

The closing of the normally open contacts 174 of relay 171 establishes a circuit from the line 167 through the now closed contacts 174, wire 190, normally closed contacts 191 of relay 192, wire 193, operating solenoid 194 of relay 195 to the line 172. Energization of the relay 195 closes its normally open contacts 196, 197. The closing of contacts 196 establishes a holding circuit for the relay 195 from the line 167 through now closed contacts 196 of relay 195 to wire 190. The closing of contact 197 of relay 195 establishes a circuit from the line 167 through the now closed contacts 197, wire 203 and operating solenoid 204 of valve 137 to line 172.

The energization of the operating solenoid 204 of valve 137 shifts the valve to the right, as shown in FIG. 5, to connect conduit 155 which, as previously stated, is normally supplied with fluid at a less pressure than the pressure maintained in the supply conduit 153 through the pressure reducing valve 154, to conduit 205 which conduit is in turn connected to conduit 135 through a check valve 206 preventing the flow of fluid from conduit 135 to conduit 205. At this time, however, the pressure in conduit 135 exceeds that in conduit 205.

The closing of contacts 165–166 of push button switch 160 simultaneously with the closing of contacts 161–162 establishes a circuit from the power line 167 through now closed contacts 165–166, wire 208 and operating solenoid 210 of relay 211 to line 172 thereby actuating the relay to close its normally open contacts 212, 213. The closing of the normally open contacts 212 establishes a circuit from the line 167 through wire 214 and operating solenoids 178', 180' of valve 131', 141' to line 172 shifting the valve to the left, as viewed in FIG. 4, thereby causing the spindle 25 and in turn the spindle 27 to be extended, that is, moved towards the spindles 24, 26.

The closing of the normally open contacts 213 of relay 211 establishes a circuit from the line 167 through the now closed contacts 213, wire 215, normally closed contacts 216 of relay 217, wire 218, operating solenoid 220 of relay 221 to the line 172. Energization of the relay 221 closes its normally open contacts 222, 223. The closing of contacts 222 establishes a holding circuit for relay 221 from the line 167 through now closed contacts 222 of relay 221 to wire 215. The closing of contact 223 establishes a circuit from the line 167 through the now closed contacts 223, wire 230 and operating solenoid 204' of valve 137' to line 172 shifting the valve to the left, as viewed in FIG. 4, to connect the conduit 135' to the conduit 155' which, as previously stated, is normally supplied with fluid at a less pressure than that maintained in the supply conduit 153', to conduit 205'.

The spindles continue to move towards their fully extended positions as long as the switch 160 is held in position to maintain its normally open contacts closed or until further movement of the spindles is prevented by the engagement of the chucks carried thereby with a log, or if there is no log, between the spindles until the piston head members reach the ends of their stroke. The spindles at the opposite ends of the lathe approach each other at uniform speeds because of the vane-type motors 126, 126' which are connected by the clutch 181 so that the rotors thereof rotate in unison. When the switch 160 is released, the control valves 131, 131', 141, 141' return to their normal positions. Low pressure fluid, however, is supplied to the outer ends of the piston head members through the valves 137, 137' which remain open. In the event switch 160 is released before the chucks carried by the spindles engage a log or before the spindles are fully extended, the spindles will continue to move or creep at a relatively slow speed either into engagement with the log or towards their fully extended position, as the case may be, because of small by-pass openings 232, 232' in the valves 131, 131', respectively, and similar openings 233, 233' in the valves 136, 136' which allow fluid to enter or escape from the cylinder member ahead of the piston head members.

Normally the switch 160 is maintained closed until the chucks engage and are securely imbedded in the ends of a log to be cut or peeled. The chucks are thereafter held in secure engagement with the ends of the log by the fluid supplied through the valves 137, 137'. Any fluid which might escape around the piston head assemblies is permitted to return to the sump through the small by-pass apertures 232, 232', 233, 233', previously mentioned. This prevents any possibility of back pressure building up in the inner ends of the cylinders.

After a log has been chucked the spindles are rotated and the cutting or peeling operation commenced and continued with both the large and small chucks in engagement with the log until the cutter bar reaches a predetermined position in its movement towards the center of the axis of rotation of the spindles, which position is shortly before the diameter of the log being peeled is reduced to the diameter of the larger chucks. When the cutter bar has reached this position an adjustable trip on the cutter bar actuates a limit switch 235 to close its normally open contacts 236–237.

The closing of the normally open contacts 236–237 of limit switch 235 establishes a circuit from the line 167 through the now closed contacts 236–237, wire 240 and operating solenoid 241 of relay 242 to line 172, energizing the relay to close its normally open contacts 243, 244, 245, 246. The closing of contacts 243 establishes a holding circuit from relay 242 from the line 167 through the now closed contacts 247 of relay 248, wire 250, now closed contacts 243 of relay 242, to wire 240. The closing of contacts 244 and 245 of relay 242 establish parallel circuits from the power line 167 through the wires 255, 256 and the operating solenoids 257, 258, 257', 258' of valves 131, 142, 131', 142', respectively, to the line 172. Energization of the solenoids 257, 257' of valves 131, 131' shifts the valve 131 towards the left and the valve 131' towards the right, as viewed in FIG. 4, see also FIG. 8, connecting the fluid supply conduit 153, 153' to the conduits 133, 133', respectively, and the sump conduits 156, 156' to the conduits 127, 127', respectively. Fluid under the higher pressure is thus supplied by the conduits 133, 133' to the inner ends of the cylinders within which the piston head members 51, 51' reciprocate. The cylinder chambers at the opposite side of the piston head members 51, 51' which continues to be supplied by fluid under the lower pressure, are connected to the conduit 127, 127' and in turn the sump through the conduits 124, 124', the vane-type fluid motor 126, 126' and the pressure counterbalance valves 128, 128'. Since the pressure on the inner sides of the piston head members 51, 51' is greater than the pressure on the opposite sides thereof, the large spindles begin to retract. Energization of the solenoids 258, 258' of valves 142, 142' shifts the valves to connect conduits 140, 140' to the sump conduit 156 thereby allowing fluid present in the inner ends of the counterbores 50, 50' to escape to the sump.

The large spindles retract simultaneously at the same speed because of the energization of the operating solenoid 187 of clutch 181 by the closing of contacts 246 of relay 242, previously referred to, which contacts are in parallel circuit with the contacts 185 of relay 184 between the line 167 and the wire 186. The counterbalancing valves 128, 128' are adjustable and are preferable adjusted to open at the same back pressures. Slight variations in these adjustments should not affect the uniform retraction of the two large spindles because of the vane-type motors, 126, 126', employed in the preferred embodiment of the invention shown. If, however, difficulty is experienced in adjusting the counterbalancing valves, the fluid circuits shown can be modified to use a single counterbalancing valve common to both ends of the lathe. The holding circuit for the relay 242 assures complete retraction of the large spindles and the chucks carried thereby, and their retention in retracted position during the remainder of the peeling operation.

The holding circuit for relay 242 can be omitted if desired because the engagement between the members 89, 89' of the piston head assembly connected to the large spindles with the tubular members 90, 90' relieves or should relieve the outer ends of the cylinder members 55, 55' of the holding pressure when the spindles are in their retracted positions. As a further alternative construction, the members 90, 90' could be eliminated since the maintenance of high pressure at the inner ends of the cylinder members 55, 55' will maintain the large spindles retracted, as previously explained, even though the opposite or other sides of the piston head assemblies connected to the large spindles are subjected to the holding pressure.

The large spindles can be retracted at any time prior to actuation of the limit switch 235 by the operator depressing the "retract both large spindles" push button switch 260, the normally open contacts 261, 262 of which are in parallel circuit with the normally open contacts of limit switch 235 between the line 167 and the wire 240.

The lathe continues to operate with the log being held by the small spindles and chucks 22, 23 until the operator closes the normally open "retract both small spindles" push button switch 265 which establishes a circuit from the line 167 through the wire 266, through the operating solenoid 267 of relay 248 to line 172. Energization of the relay 248 opens its normally closed contacts 247 and closes its normally open contacts 270, 271. The opening of the normally closed contacts 247 breaks the holding circuit for relay 242 thus allowing the valves 131, 131' to return to their normal positions. The closing of contacts 270, 271 of relay 248 establish parallel circuits from the line 167 through the wires 272, 273 and the operating solenoids 274, 274' of valves 136, 136' shifting the valves away from one another, as viewed in FIG. 4, thus connecting the sump conduits 156, 156' to conduits 135, 135' connected to the outer ends of the cylinders or counterbores 50, 50' within which the piston head members 100, 100' reciprocate and the fluid supply conduits 153, 153' to conduit 140, 140' connected to the opposite sides of piston head members 100, 100'. This applies pressure to the inner sides of the piston head members 100, 100' and in the direction to retract the small spindles 26, 27. Any fluid trapped in the outer ends of the cylinder members 55, 55', after the engagement of the members 80, 80' connected to the piston head members 51, 51' with the tubular extensions 90, 90' will escape through the by-pass valves 138, 138'.

Simultaneously with the energization of the operating solenoids 274, 274', the operating solenoids 277, 278 of relays 192, 217, respectively, which are in parallel circuit therewith, are energized opening their normally closed contacts 191, 216, respectively, in series circuit with the operating solenoids of relays 195, 221 thus deenergizing these relays and in turn deenergizing the operating solenoids 204, 204' of valves 137, 137' allowing the valves to return to their closed positions. The small spindles 26, 27 continue to move towards their fully retracted positions as long as the "retract both small spindles" push button switch 265 is maintained closed by the operator.

Both small spindles may be simultaneously extended by the operator depressing the "extend both small spindles" push button switch 280 to close its normally open contacts 281–282, 283–284 thus establishing parallel circuits from the line 167 through the wires 285, 286 and the operating solenoids 287, 288 of relays 290, 291 to line 172. Energization of the relay 290 closes its normally open contacts 292, 293. Energization of the relay 291 closes its normally open contacts 294, 295. The closing of contacts 292, 294 of relays 290, 291 establish parallel circuits from the line 167 through the wires 296, 297 and the operating solenoids 298, 298' of valves 136, 136', respectively, to line 172. Energization of the operating solenoids 298, 298' of valves 136, 136' shifts the valves towards one another, as viewed in FIG. 4, connecting the fluid supply conduits 153, 153' to the conduits 135, 135' leading to the outer ends of the cylinders within which the piston head members 100, 100' reciprocates and the sump conduits 156, 156' to the conduits 140, 140' connected to the opposite ends of the cylinders within which the piston head members 100, 100' reciprocate. This causes the small spindles to be extended. Movement of the small spindles toward their extended positions under high pressure fluid continues as long as the push button switch 280 is maintained closed.

The contacts 293, 295 of relays 290, 291, respectively, are in parallel circuit with the contacts 174 of relay 171 and 213 of relay 211, respectively, and upon their closing simultaneously with the closing of the contacts 292, 294 of relays 290, 291, respectively, relays 195, 221 are energized and the valves 137, 137' open in a manner previously described. This maintains fluid at reduced pressure upon the outer ends of the cylinder head members 100, 100' subsequent to release of the push button switch 280 by the operator and the chucks carried by the small spindles in firm engagement with the log, etc., all as previously described. Both small spindles can be retracted when desired by the operator depressing the "retract both small spindles" push button switch 265, as previously described.

The large spindle 24 at the left-hand end of the lathe can be extended independently of the spindles at the other end of the lathe by the operator depressing the "extend left-hand large spindle" push button switch 300, the normally open contacts 301–302 of which are in parallel circuit with the contacts 161, 162 of switch 160 between the line 167 and the wire 168. In a similar manner the large spindle 25, at the right-hand end of the lathe, can be extended independently of the spindles at the left-hand end of the lathe by the operator depressing the "extend right large spindle" push button switch 304 to close its normally open contacts 305–306 which are in parallel circuit with the contacts 165, 166 of push button switch 160 between the line 167 and the wire 208. The left-hand small spindle 26 can be extended independently of the other spindles by the operator depressing the "extend left-hand small spindle" push button switch 310, the normally open contacts 311–312 of which are in parallel circuit with the contacts 281, 282 of switch 180 between the line 167 and the wire 285. The small spindle 27, at the right-hand end of the lathe, can be extended independently of the other spindles by the operator depressing the "extend small right-hand spindle" push button switch 315 to close its normally open contacts 316–317 which are in parallel circuit with the contacts 283, 284 of switch 280 between the line 167 and the wire 286.

The small spindle 26, at the left-hand end of the lathe, can be retracted independently by the operator depressing the "retract small left-hand spindle" push button switch 320 to close its normally open contacts 321–322 which are in parallel circuit with the normally open contacts 270 of relay 248 between the line 167 and the wire 272. The small spindle 27, at the right-hand end of the lathe can be retracted independently by the operator depressing the "retract small right-hand spindle" push button switch 325 to close its normally open contacts 326–327, which are in parallel circuit with the normally open contact 271 of relay 248 between the line 167 and the wire 273.

Both spindles at the left-hand end of the lathe can be retracted without moving the spindles at the right-hand end of the lathe by the operator closing the "retract both left-hand spindles" push button switch 330 to close its normally open contacts 231–232, thus establishing a circuit from the line 167 through the now closed contacts 331–332, wire 334 and operating solenoid 335 of relay 346 to line 172 actuating the relay to close its normally open contacts 340, 341. The closing of normally open contacts 340 of relay 336, which are in parallel circuit with the contacts 244 of relay 242 between the line 167 and the wire 255, energizes the operating solenoid 257 of valve 131 thus shifting the valve into position to retract the large spindle 24. The closing of contacts 341 of relay 336, which are in parallel circuit with the contacts 270 of relay 248 between the line 167 and the wire 272 energizes the operating solenoid 274 of valve 136 thus shifting the valve into position to retract the small spindle 26.

Both spindles at the right-hand end of the lathe can be retracted without moving the spindles at the left-hand end of the lathe by the operator closing the "retract both right-hand spindles" push button switch 345 to close its normally open contacts 346–347 thus establishing a circuit from the line 167 through the now closed contacts 346–347, wire 348 and operating solenoid 350 of relay 351 to line 172 actuating the relay to close its normally open contacts 352, 353.

The closing of normally open contacts 352 of relay 351, which are in parallel circuit with the contacts 245 of relay 242 between the line 167 and the wire 256, energizes the operating solenoid 257' of valve 131' thus shifting the valve into position to retract the large spindle 25. The closing of contacts 353 of relay 351, which are in parallel circuit with the contacts 271 of relay 248 between the line 167 and the wire 273 energizes the operating solenoid 274' of valve 136' thus shifting the valve into position to retract the small spindle 27.

One of the features of the control disclosed is the maintenance of reduced pressure on the spindles during the cutting operation thus permitting a higher pressure to be employed to initially seat the chucks in the logs than might be desirable to maintain on the log during the peeling operation as the log may bend if too high a pressure is employed upon the spindles. The pressure reducing regulators 154, 154' are adjustable as are the pumps 150, 150' and are preferably such that pressure from 300 to 600 pounds per square inch, and more, can be employed to initially seat the chucks in the log, and the chucks maintained engaged with the log during the cutting operation at substantially less pressure, for example, with pressures from 50 to 300 pounds per square inch. Full pressure, however, may be maintained in the fluid pressure actuated motors during the cutting operation, if desired. As an alternative arrangement, the holding pressures can be removed entirely by providing a selector switch, by the use of which the operator can remove the relays 195, 221 from the circuit.

In the embodiment of the invention shown the piston assemblies (piston head and rod) of the pressure fluid actuated motors are formed as parts of the spindles reciprocated thereby and therefore rotate with the spindles. The piston rings are preferably made of a material different from that of either the piston proper or the cylinder wall, and a material which will not gall and thus interfere with movement of the piston ring relative to either the piston or the cylinder wall within which they reciprocate. The grooves in the piston within which the piston rings are located are relatively deep as compared to that employed in conventional reciprocating type fluid motors using piston rings. The depth of the grooves is preferably about one and one-half times the thickness of the rings and the clearance between the piston rings and the bottom of the grooves, within which they are located, is preferably about twice the clearance of the piston members proper in the cylinders within which they reciprocate. The piston assemblies, if desired, may be formed as separate parts connected with the spindles by suitable thrust bearings. In this event the piston assemblies would not necessarily rotate and the bearings 71, 71' could be omitted.

The tubular members 90, 111, 90', 111' merely constitute means for providing fluid conduits from the exterior of the cylinder assembly comprising the parts 55, 56, 65, 91, etc. to opposite ends of the cylindrical apertures or counterbores 50, 50' in the outer and larger spindles within which the piston heads connected to the inner and smaller spindles reciprocate. The conduits can be provided in different ways, for example, the parts of the members 90, 111, 90', 111' which project into the respective cylindrical apertures within which the piston heads reciprocate and into the apertures in the smaller spindles opening into the outer ends thereof could be formed as integral bosses on the outer cylinder head assemblies having fluid ingress and egress ports in their projecting ends.

The invention is applicable to veneer lathes having a pair of concentric fluid actuated spindles at one end of the lathe and one or more spindles at the other end actuated or reciprocated by some other means, for example, a screw and nut device.

While the preferred embodiment of the invention has been described in considerable detail the invention is not limited to the construction shown and it is the intention to cover hereby all adaptations, modifications and changes therein which come within the practice of those skilled in the art to which it relates and the scope of the appended claims.

Having thus described my invention, what I claim is:

1. In a pressure fluid actuated reciprocating-type power means, a cylinder assembly having a first cylindrical aperture therein closed at both ends, a first piston assembly having one end projecting into said first cylindrical aperture from one end of said cylinder assembly, said first piston assembly having a first piston head member on said end thereof slideable in said first cylindrical aperture, said first piston assembly having a second cylindrical aperture therein, a second piston assembly having one end projecting into said second cylindrical aperture, said second piston assembly having a second piston head on said end thereof and an axially extending aperture opening into said end thereof, a first boss on the end of said cylinder assembly opposite said one end, projecting axially into said first cylinder chamber and said first piston head when said first piston head is adjacent to said end of said cylinder assembly, a second boss of less diameter than the external diameter of said first boss fixed to said end of said cylinder assembly to which said first boss is fixed and concentric with said first boss, said second boss projecting into the interior of said first cylindrical aperture a distance greater than the projection of said first boss and into said aperture in said second piston assembly, sealing means carried by said first piston assembly adapted to engage the exterior of said first boss, sealing means carried by said second piston assembly in engagement with the exterior of said second boss, and means for selectively connecting opposite ends of said first and second cylindrical apertures to a source of fluid pressure and to discharge means, said means comprising fluid ingress and egress port means opening into the projecting ends of said first and second bosses and fluid conduit means communicating between said aperture in said second piston assembly at the projecting end of said second boss and said second cylindrical aperture adjacent to the side of said second piston head remote from said end of said cylinder assembly from which said bosses project.

2. In a pressure fluid actuated reciprocating-type power means, a cylinder assembly having a first cylindrical aperture therein closed at both ends, a first boss on one end of said cylinder assembly projecting into said first cylindrical aperture from said one end, a second boss of less external diameter than the external diameter of said first boss fixed to said one end of said cylinder assembly concentric with said first boss and projecting into said first cylindrical aperture from said one end a distance greater than the projection of said first boss, a first tubular piston assembly having one end projecting into the interior of said first cylindrical aperture from the end thereof opposite to said one end, said first piston assembly having a first piston head on the end thereof projecting into said first cylindrical aperture and in sliding engagement with the interior thereof and when said first piston head is adjacent to said one end of said cylinder assembly with the exterior of said first boss, said first piston assembly having a second cylindrical aperture therein, a second piston assembly slideable within the first piston assembly and having an end projecting into the interior of said second cylindrical aperture from the end thereof farthest from said one end of said cylinder assembly, said second piston assembly having a second piston head on the end thereof projecting into said second cylindrical aperture the exterior of which slideably engages the interior of said second cylindrical aperture and the interior of which engages the exterior of said second boss, said second piston assembly having an axially extending aperture opening into the end thereof adjacent to said one end of said cylinder assembly and into which the projecting end of said second boss projects, conduit means in said second piston assembly forming a communication between said aperture at the end of said second boss and said second cylindrical aperture adjacent to the side of said second piston head remote from said one end of said cylinder assembly, means for supplying and exhausting pressure fluid through the projecting end of said first boss, means for supplying and exhausting pressure fluid through the projecting end of said second boss, means for supplying and exhausting pressure fluid from one end of said first cylindrical aperture, and means for supplying and exhausting fluid from the other end of said first cylindrical aperture.

References Cited in the file of this patent

UNITED STATES PATENTS

| | | |
|---|---|---|
| 878,298 | Lichtig | Feb. 4, 1908 |
| 2,502,547 | Adams et al. | Apr. 4, 1950 |
| 2,766,786 | Molyneux | Oct. 16, 1956 |
| 3,052,272 | Yock | Sept. 4, 1962 |